(12) United States Patent
Boyd

(10) Patent No.: US 6,520,115 B2
(45) Date of Patent: Feb. 18, 2003

(54) SUPPORT PLATFORM AND STRUCTURE FOR FISH FARMING ("ARTIFICIAL ISLAND REEF PLATFORM")

(76) Inventor: Secil Boyd, P.O. Box 427, Holualoa, HI (US) 96725

( * ) Notice: Subject to any disclaimer, the term of this patent is extended or adjusted under 35 U.S.C. 154(b) by 0 days.

(21) Appl. No.: 09/948,926

(22) Filed: Sep. 5, 2001

(65) Prior Publication Data

US 2002/0162515 A1 Nov. 7, 2002

Related U.S. Application Data

(60) Provisional application No. 60/230,470, filed on Sep. 6, 2000.

(51) Int. Cl.⁷ .............................................. A01K 61/00
(52) U.S. Cl. ...................................................... 119/223
(58) Field of Search ................................. 109/223, 221, 109/224, 225, 238, 239, 240, 208

(56) References Cited

U.S. PATENT DOCUMENTS

| | | | | |
|---|---|---|---|---|
| 3,741,159 A | * | 6/1973 | Halaunbrenner | 119/240 |
| 4,744,331 A | * | 5/1988 | Whiffin | 119/223 |
| 4,876,985 A | * | 10/1989 | Marcum et al. | 119/240 |
| 5,172,649 A | * | 12/1992 | Bourgeois | 119/223 |
| 5,213,058 A | * | 5/1993 | Parker et al. | 119/208 |
| 5,400,745 A | * | 3/1995 | Saxby et al. | 119/239 |
| 5,653,193 A | * | 8/1997 | Marissal | 119/240 |
| 5,970,917 A | * | 10/1999 | Keith, Jr. | 119/223 |
| 6,044,798 A | * | 4/2000 | Foster et al. | 119/223 |

FOREIGN PATENT DOCUMENTS

| | | | |
|---|---|---|---|
| JP | 5-304856 | * | 11/1993 |
| WO | WO 89/12388 | * | 12/1989 |
| WO | WO 92/02129 | * | 2/1992 |

* cited by examiner

Primary Examiner—Yvonne Abbott

(57) ABSTRACT

A structure designed for raising large (commercial) quantities of pelagic fish. The structure, called an "Artificial Island Reef Platform" or "AIR Platform" is comprised of floating platform components with a large subsurface framework and cable network suitable for supporting a multiplicity of nets, each one enclosing and controlling a separate and distinct ocean volume. Various innovative design features permit the stable anchoring, supporting, and positioning of the AIR Platform, and control the distribution of oxygenated water and food, and the removal of waste products.

Variants of this invention could be utilized for fresh-water fish farming in appropriate locations in lakes, reservoirs, or rivers.

6 Claims, 3 Drawing Sheets

SUPPORT PLATFORM AND STRUCTURE FOR FISH FARMING ("ARTIFICIAL ISLAND REEF PLATFORM")

This application claims the benefit of provisional application No. 60/230,470, filed Sep. 6, 2000.

BACKGROUND OF THE INVENTION

1. Field of the Invention

The disclosed invention relates to the field of aquaculture or fish farming, and employs a specially designed large buoyant structure to stabilize and support the components delimiting, servicing, and controlling the water volumes to be farmed.

2. Description of the Related Art

Only a relative few special purpose, large floating platforms appear to have been patented. Lown (U.S. Pat. No. 3,951,086, Apr. 20, 1976 envisions a deck, as in a raft, supported from below by a multiplicity of specialized floating vertical columns that act as motion attenuators in order to achieve a quite stable platform. Matsui (U.S. Pat. No. 4,286,538, Sep. 1, 1981 constructs a "multipurpose" floating structure which is a composite of many individual flotation units joined in a regular reticulated pattern. Kim (U.S. Pat. No. 4,406,243, Sep. 27, 1983) contemplates a waterborne building with prefabricated rooms supported by a modified hemispherical flotation device. Tellington (U.S. Pat. No. 5,588,387, Dec. 31, 1996) couples a plurality of floating modules together to form a composite platform and controls its motion using a system of propulsion jets. Carroll et. al. (U.S. Pat. No. 4,409,921, Oct. 16, 1983) design a modular floating platform that can easily be assembled and disassembled, for use inside partially water-filled vessels. Scholl et. al. (U.S. Pat. No. 3,771,484, Nov. 11, 1973) envision an inflatable floating island. None of the above are similar to the AIR Platform described herein.

A greater number of fish farming facilities have been patented, and these can be generally categorized as follows:

Fish farming facilities based on modified ships, barges, or platforms: Bourg (U.S. Pat. No. 5,095,851, Mar. 17, 1992) teaches the conversion of a hopper barge to allow the circulation of water, oxygen, food, antibiotics, etc. as needed within habitation tanks, and this can be adapted for fish or shellfish. Crappel and Crochet (U.S. Pat. No. 5,596,947, Jan. 28, 1997) employ an oil- or gas-well production platform and raise or lower fish cages therefrom. Erickson and Boad (U.S. Pat. No. 5,438,958, Aug. 8, 1995) similarly employ abandoned oil platforms or use a specially constructed platform/support structure.

Fish cages or nets with various designs and features: Yoneya (U.S. Pat. No. 4,170,196, Oct. 9, 1979) designed a simple framed and netted fish enclosure, with a closeable mouth at the top. Streichenberger (U.S. Pat. No. 4,257,350, Mar. 24, 1981) employed a bow net of rigid construction with buoyancy tanks. Knott (U.S. Pat. No. 5,967,086, Oct. 19, 1999) and Keith (U.S. Pat. No. 5,970,917, Oct. 26, 1999) both employed stiff wire mesh (20 gauge or greater) cages, to resist deformation and predators. Otamendi-Busto (U.S. Pat. No. 4,936,253, Jun. 26, 1990) designed a cylindrical submersible cultivation cage with ballast tanks and a vertical column supporting maintenance and personnel facilities. Vangen (U.S. Pat. No. 4,712,509, Dec. 15, 1987) proposed an array of two rows of rectangular fish cages connected to each other using horizontal pivots. Willinsky and Robson (U.S. Pat. No. 5,251,571, Oct. 12, 1993) described a rotatable, netted geodesic enclosure with flotation chambers, to be moored in a fixed position. Whiffen (U.S. Pat. No. 4,744,331, May 17, 1988) envisioned sea pens with a tightly-controlled buoyancy device to specifically locate the pens in the optimal temperature/nutrition zones in the water. Bourgeois (U.S. Pat. No. 5,172,649, Dec. 22, 1992) envisioned concentric frames with radial elements between them, with nets separating each ocean volume delimited by successive frame elements. Rosen and Wulff (U.S. Pat. No. 4,798,169, Jan. 17, 1989) designed a framework of hollow, floating members around a netted enclosure. Koma (U.S. Pat. No. 4,957,064, Sep. 18, 1990) used a similar concept, but extended additional netting to the side, supported by floats, and at the bottom, moored to the sea floor. Holyoak (U.S. Pat. No. 4,429,659, Feb. 7, 1984) designed a multiplicity of cages with similar floating structural members, and employed a conveyor system that moved the cages through feeding zones and into a treatment area. Bones (U.S. Pat. No. 5,628,279, May 13, 1997) utilized a hexagonally-framed fish cage with a specially mounted feeding tube. Nett (U.S. Pat. No. 4,982,697, Jan. 8, 1991) developed a net cage specifically for farming algae-eating aquatic animals, with a means of growing algae on portions of the nets and then making these net surfaces available to the animals.

Solid enclosures with a greater or lesser number of openings: Martelius (U.S. Pat. No. 5,715,773, Feb. 10, 1998) designed a walled structure with some openings in the sides and a flow-intensifying device in the upper edge of the enclosed space, particularly for rearing fry. Brinkworth (U.S. Pat. No. 4,279,218, Jul. 21, 1981) contemplated maintaining a compatible marine environment within an enclosed habitat by importing desirable water from a favorable environment through conduits. Rowley (U.S. Pat. No. 4,320,717, Mar. 23, 1982) employed a plurality of enclosed habitat modules conveniently stacked and served by feeder risers. Meilahn (U.S. Pat. No. 5,762,024, Jun. 9, 1998) described a rigid-walled, floating tank with a floating pump assembly capable of drawing water from variable depths to select the desired temperature and purity.

Apparatuses that provide controlled substrates for cultivation of surface-adhering species, such as abalone: Foster and Locke (U.S. Pat. No. 6,044,798, Apr. 4, 2000) described a framework with removable panels of substrate material that can be suspended in water in the appropriate environment.

In addition, the prior art contains references to specialized devices which are intended to be appurtenances to aquaculture systems, that add special features or improve certain functions of said systems, such as: Ochs (U.S. Pat. No. 4,886,015, Dec. 12, 1989), who designed a special modular marine flotation collar with aquaculture applications, or Morimura (U.S. Pat. No. 4,610,219, Sep. 9, 1986), who designed a specialized floating elastic frame member for use in fish breeding apparati. The current invention being a complete aquaculture system, it does not serve a useful purpose to extensively review patents on component devices.

Considering now the above types of aquaculture devices, the fully-enclosed variants appear cost-effective only for growing small fry to a stage where they may be farmable in other environments, or for crustaceans or other specialized uses. To completely enclose a portion of the ocean environment is impressively costly, compared to simply controlling the area with nets, which represent only minor cost per unit area controlled by comparison. For most applications, such solid (or mostly solid) enclosures do not compare economically to open-habitat fishing the old-fashioned way. Vessel-based aquaculture facilities are similarly expensive because of the cost of the vessel, essentially a "complete enclosure".

Platform-based or barge-based fish cages appear to be similar to floating fish cages (considered below), but with a different mooring or support principle.

Fish cages or nets are the most cost-effective way of controlling ocean volume, and the many patents in this area offer different design treatments that distinguish them from each other, but seldom offer significant advantages, one over the other, in unique technologies that improve yield, reduce cost, or produce other practical advantages. In general the above-cited inventions fail to economically oxygenate the controlled water, and therefore the concentration of fish to be raised is unduly limited. The AIR Platform is unique in its use of design features to passively oxygenate a large volume of controlled water, thereby increasing the yield of farmed fish to reach a very successful economic comparison with open-ocean fishing. The AIR Platform also uniquely vents bio-waste.

In contradistinction to most prior art, the AIR Platform encourages biodiversity within and upon its structure, allowing the growth and development of entire food chains within it and in its near ocean environment. This allows the invention to act as a breeding ground for a wide variety of marine life that can assist the production of the fish within it, and can also assist in replenishing the open-ocean fishery stocks in the vicinity.

SUMMARY OF THE INVENTION

The within invention, called an "Artificial Island Reef Platform" or "AIR Platform", designed for raising large (commercial) quantities of fish, is comprised of floating platform components with a large subsurface framework and cable network suitable for supporting a multiplicity of nets. Each net encloses and controls a separate and distinct ocean volume, thereby permitting appropriate staging in the continuous farming of suitable fish, and also permitting the maintenance and/or replacement of individual nets without affecting the production of neighboring nets.

Various innovative design features, described below, permit the stable anchoring, supporting, and positioning of the AIR Platform, and control the distribution of oxygenated water and food, and the removal of waste products. Controlled, variable flotation devices orient the Platform, and permit it to float higher or lower in the water, as desired; and may permit it to mostly submerge during excessively stormy weather.

Design features allow the AIR Platform to "fly" in ocean currents like a kite flies in the air; and indeed, the invention is optimally intended for those ocean areas where current is regular and dependable (in quieter areas or during quiet periods, backup systems [not part of the invention, and not shown in the drawings] achieve the distribution of aerated water and nutrients). The leading end of the Platform is designed to separate the flow of current past the entire structure in the manner of a hydrofoil on an airplane wing or a fairing on a motorcycle, but is controllably porous so that sufficient oncoming water may enter the structure to create a necessary net flow of water through the Platform as well.

With the majority of the current passing above and below the Platform, special deflectors and diffusers may be properly positioned to draw oxygenated water (from above) into each of the individually netted areas, and exhaust it at the bottom. These devices are innovatively designed to produce their majority effect within the area of each individual net, despite the overall draw of some of the water through the Platform's controllably porous leading end. Feeding tubes deliver nutrients controllably into the volumes delimited by each cage.

The entire Platform is surrounded by netting as well (in part for predator control), so that the areas outside of each individual net, but interior to the entire Platform, are controlled; and these areas may be utilized to farm other useful marine life, though less intensively than inside the individual nets or cages.

The entire floating AIR Platform, containing as much life as it does, will act like a reef, enriching the immediate vicinity and resulting in the aggregation and breeding of many varieties of uncaged marine life. The strategic deployment of several of the Platforms properly distanced from each other will create a zone of enrichment, allowing the renewal of depleted populations of fish, in an ecologically correct and assistive manner. Predator control will be an issue, but is not a part of the within invention.

The elegant simplicity of the preferred embodiments of the invention permits the greatest possible utilization of existing commercially-available components, rendering the invention affordable. It is the unique compounding of the elements of the AIR Platform, and its design features, that comprise the invention.

Further attributes of the invention are elucidated within the description below.

The foregoing aspects, attributes and objects, and further, related aspects, attributes and objects, of this disclosed invention are illustrated in the embodiment diagrammed in the accompanying drawings. These drawings are for purposes of illustration, and it is cautioned that departures from these drawings in materials and specific construction may occur without departure from the concept of the present invention.

DETAILED DESCRIPTION OF THE PREFERRED EMBODIMENT

Figure 1:
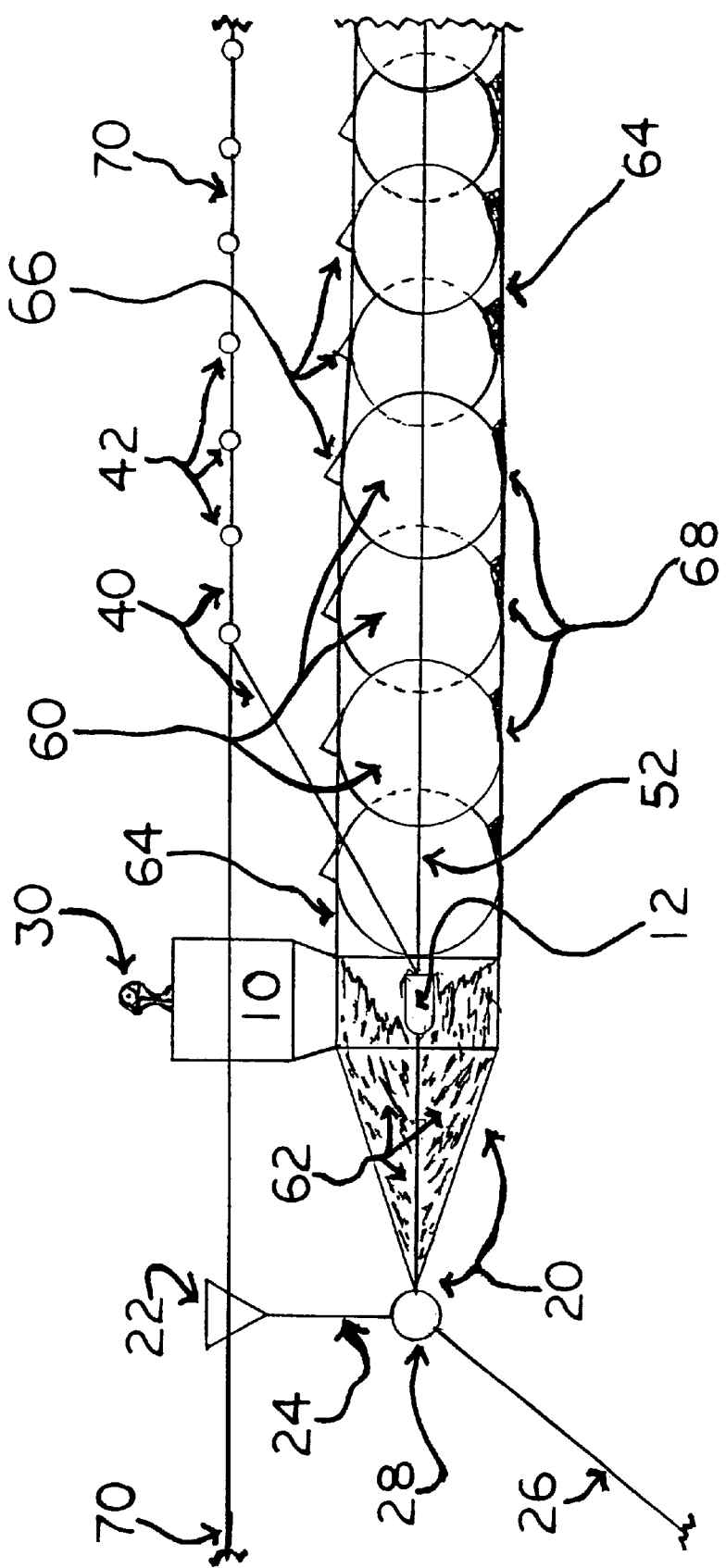
FIG. 1 shows the invention from above, positioned with the leading edge represented by the Primary Displacement Module [22] and the Surface Displacement Module [10]. The balance of the device, positioned behind the Spreader Beams [12], floats behind these structures in the current.
Figure 2:
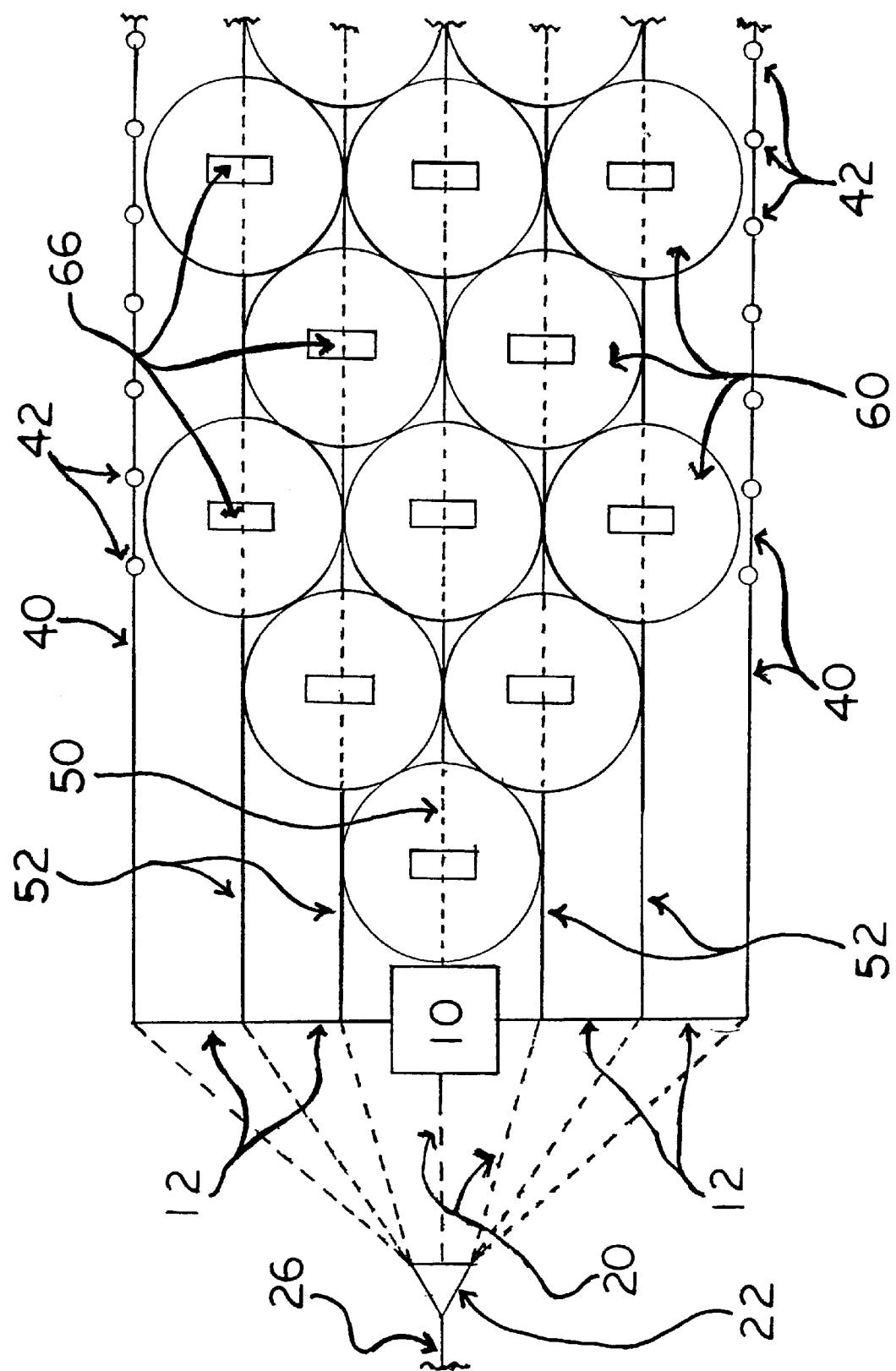
FIG. 2 is a side view of the invention shown positioned approximately as intended below the water line [70] (not to scale).

FIGS. 1 and 2 illustrate the major features and innovations present in an AIR Platform. The leading structural element of the device is comprised of the Surface Displacement Module [10] and the Spreader Beams [12], which support the Primary [50] and Secondary [52] Runner Cables and their appurtenances. The Perimeter Identification Cables [40] and Floats [42] (the latter with optional lights as may be helpful or even required in certain jurisdictions) run lateral to and mostly above the assembly of Runner Cables [50, 52], and delimit the edges of the invention.

The individual Cages [60] (dubbed "Rotegrities" if a spherical shape is chosen as shown herein) are suspended from and fastened to the Runner Cables [50, 52]. Around the perimeter, and top and bottom, of the assembly of Cages [60] is a protective netting called the Net Skin [64], completely enclosing the assembly.

Other embodiments of the invention may omit the portion of the Surface Displacement Module [10] that herein is shown residing above the surface of the water; but the presence of such a surface on at least one of an array of AIR Platforms will provide a reasonable working surface upon which to base maintenance and fish processing functions, reducing the requirement for attendant vessels. And the specific geometry of the array and specific means of support and attachment may vary without departing from the spirit of the within invention.

In front of the Surface Displacement Module [10] and Spreader Beams [12] is the Primary Displacement Module [22] which serves, via its own Harness [24], to suspend the Underwater Pivot Point [28] at a proper distance below the Water Line [70]. The Pivot Point [28] represents the true leading point of the device (with reference to the direction of ocean current flow), and is controllably moored by the Mooring Line [26]. The Mooring Assembly Harness [20] performs the dual purposes of (A) suspending the balance of the structure behind the Pivot Point [28] in the flow of the ocean current like a tail behind a kite, via its attachments to the Surface Displacement Module [10] and Spreader Beams [12], and (B) supporting the Fairing [62], a partially permeable membrane which allows some current flow through, but largely separates the current into a superior stream (above the body of the Platform) and an inferior stream (below). The Fairing [62] may contain controllable openings (not shown) to more exactly regulate the fraction of the total current that passes through it, versus being split into superior and inferior components, and may be shaped as required to maximize the splitting of the current. Shown diagrammatically in the figures as coming to a point at the Pivot Point [28], it may be designed instead in a blade-like fashion, or even expanded outwardly to capture larger volumes of water or to enhance current speed.

Material to the invention is not the specific shape, layout, or configuration of the above components, but the concept of a hydrodynamically designed assembly of cages, with a selectively permeable leading membrane structure which splits (or amplifies and splits) the current into regulatable flow components that are useful in the controlled suspension of the device, and, as will be shown below, in the dispersion of oxygen and nutrients within and through the component Cages.

Figure 3:
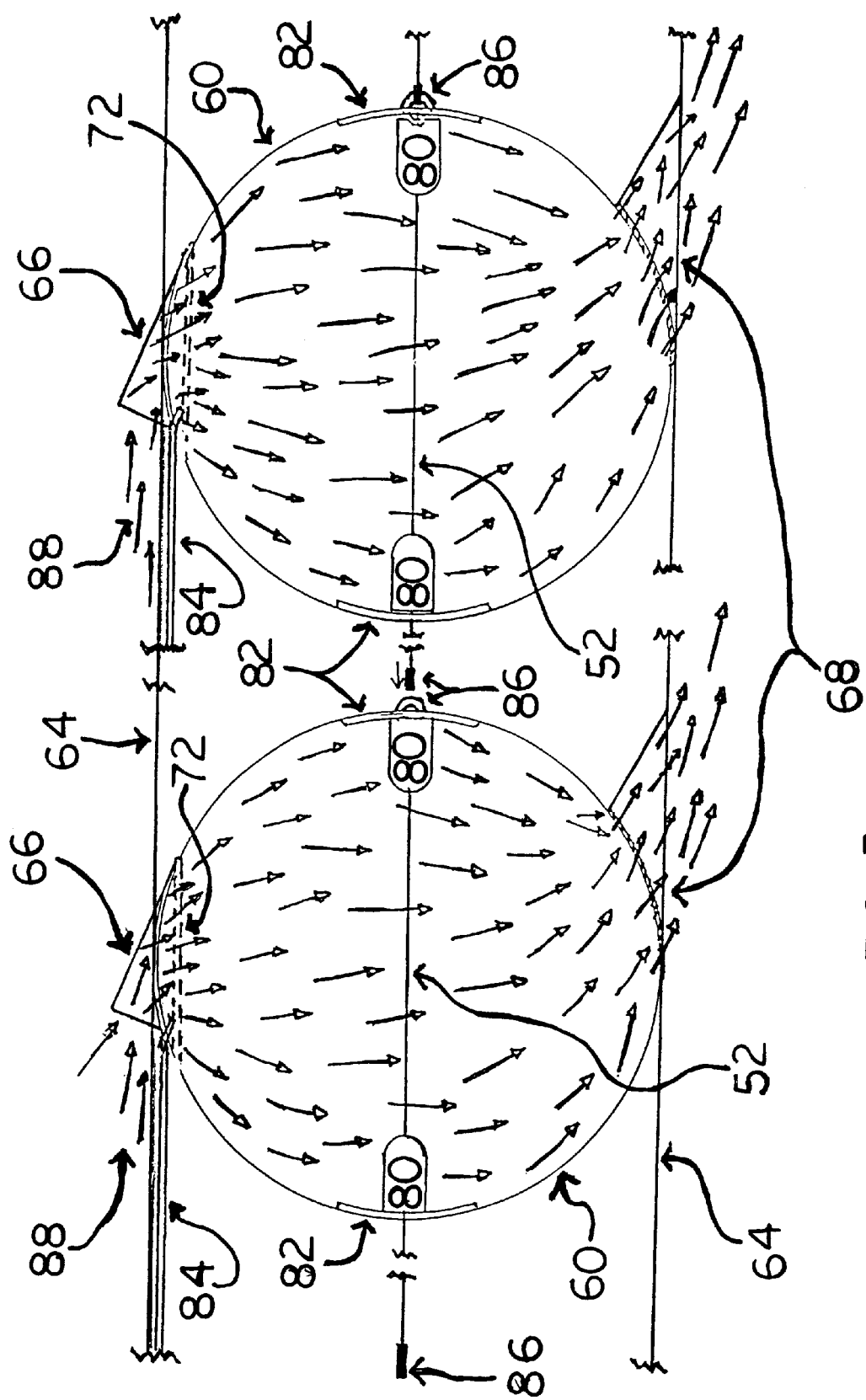
FIG. 3 is an enlarged view of two of the cages or nets (which are shown to be spherical in this embodiment, but need not be) [60], showing the major features, and the flow of water [88] into and within the cages.

Looking now to FIG. 3, the individual Cages [60] (shown as spherical herein) are attached to the Cables [50, 52] with an appropriate Cable or Chain [82]. Each Cage [60] may be equipped with one or more Buoyancy Control Devices [80], which in the aggregate control (A) the average depth of most of the device below the surface (allowing further submersion in unfavorable weather, for example) as well as (B) its attitude (or angle of inclination in the water, allowing, among other things, further control over the relative effects of the superior and inferior branches of the current). Other configurations of Buoyancy Control Devices [80] or other means of controlling the depth and attitude of the body of the invention are possible; therefore this particular configuration shall not be construed to limit the scope of the invention.

Each Cage [60] is equipped with Intake [66] and Exhaust [68] Vents, appropriately placed within the superior and inferior ocean current components respectively, designed to push oxygenated surface (superior) water flow into the area of the Cage and pull other water from within the area of the Cage into the inferior flow. A Diffuser [72], appropriately dimensioned and configured, acts to direct the incoming flow widely throughout the area of the Cage, as indicated by arrows [88]. Feeder Tubes [84] are positioned to appropriately distribute nutrients to the population within the Cages.

The invention is intended to tolerate, indeed encourage, the growth of algae and other marine life upon the cage and net structures; and this diversity of living forms is expected to improve the health and the yield of the fish that are farmed within (and stimulate enrichment in the nearby open ocean environs).

The embodiment shown herein exhibits all of the principles comprising this invention; however, devices embodying only some of these innovative principles and thereby representing an incremental improvement over existing art, could be constructed, and are also considered to be instructed by this presentation.

List of Reference Numbers

10—Surface Displacement Module
12—Spreader Beams ("Wings")
20—Mooring Assembly Harness
22—Primary Displacement Module
24—Primary Displacement Module Harness
26—Mooring Line
28—Underwater Pivot Point
30—Main Identification Light ("Head Light")
40—Surface Perimeter Identification Cables
42—Surface Perimeter Identification Floats
50—Primary Runner Cable
52—Secondary Runner Cables
60—Fish Cages (called "Rotegrities" if spherical)
62—Fairing
64—Net Skin
66—Intake Vents
68—Exhaust Vents
70—Water Line
72—Diffuser
80—Buoyancy Control Device
82—Cable Chain to Cage Attachment Frame
84—Feeder Tube
86—Cable chain Attachment Points
88—Pattern of Water Flow Within Cages

I claim:

1. An artificial reef island platform comprised of:
    a mooring line attachable at one end to either an anchoring device or to a motive device, and at the other end to a pivot point on the body of the invention;
    said pivot point being attached to a flotation device and a fairing assembly, at the leading edge of the system;
    said flotation device serves as a support framework for at least one spreader beam;
    wherein at least one cable is attached to said at least one spreader beam;
    wherein at least two cages are attached to said at least one cable and to each other;
    and wherein a perimeter net surrounds the two or more cages to further shape and control the interior floating masses, and to protect the immediate environment of the cages from predators and other influences.

2. The Platform of claim 1 which further contains secondary buoyancy control devices within or near each cage to allow for raising, lowering, tilting, or changing the shape of and otherwise controlling the depth, attitude, and configuration of the system.

3. The Platform of claim 1 wherein said fairing assembly is composed of a membrane or fabric that is semi-porous having openings distributed along its surface, which openings may be optionally closeable to controllably vary the flow of water through them, to optionally allow a portion of the flow of ocean current to pass through into the trailing portion of the platform rather than to be completely split between a superior and an inferior flow, thereby providing a means to equalize stresses and drag within and around the perimeter net as the water current-speed changes, and thereby providing a means of creating and using specific hydrodynamic flows to maintain stability and shape of a somewhat flexible, submerged mass.

4. The Platform of claim 1, wherein the individual cages within the Platform contain specially-designed vents with deflectors which are placed near the top and bottom for the purpose of deflecting exogenous water into the caged volume and exhausting less oxygenated water with organic waste components, which vents and deflectors are designed to project into the more oxygenated water above the cages to cause a continuous globe-shaped puff of said oxygenated water to push into the volume enclosed by the cages, and to exhaust a circular profile of fluid at the bottoms of the cages, thereby providing a means by which to create a semi-controllable oxygenated water flow within an aquaculture cage.

5. The Platform of claim 1, wherein said perimeter net that increases the hydrodynamic efficiency of the Platform as it is suspended in or moves through the current of water, said perimeter net also providing a protective barrier and incorporating electrical current contact points that provide a means of maintaining a predator-free environment.

6. The Platform of claim 1, wherein the individual cages may be removed, repaired, or harvested and re-stocked independently of the other cages, so that the entire device may remain in continuous production with different cages in different stages of growth of the fish;

and wherein the spaces within the perimeter net may also optionally be farmed, though less intensively with other forms of useable aquatic life.

* * * * *